United States Patent [19]

Hines et al.

[11] Patent Number: 5,234,222
[45] Date of Patent: Aug. 10, 1993

[54] WORKPIECE SUPPORT TOOL

[75] Inventors: Gordon E. Hines; Vernon J. Burzan, both of Ann Arbor; Leonard J. Salenbien, Saline; Ronald W. Anderson, Ann Arbor, all of Mich.

[73] Assignee: Hines Industries, Inc., Ann Arbor, Mich.

[21] Appl. No.: 821,640

[22] Filed: Jan. 16, 1992

Related U.S. Application Data

[63] Continuation-in-part of Ser. No. 708,453, May 31, 1991, abandoned, and Ser. No. 729,219, Jul. 12, 1991, abandoned.

[51] Int. Cl.⁵ .................................... B23B 31/16
[52] U.S. Cl. ........................ 279/2.13; 279/2.19; 279/126
[58] Field of Search ....... 73/485; 279/2.01, 2.11–2.13, 279/2.19, 126

[56] References Cited

U.S. PATENT DOCUMENTS

| | | |
|---|---|---|
| 1,361,773 | 12/1920 | Raison et al. . |
| 1,627,729 | 5/1927 | Dingee . |
| 1,654,737 | 1/1928 | Kistner . |
| 2,352,042 | 6/1944 | Vander Linde . |
| 2,481,125 | 9/1949 | Lannen . |
| 2,693,784 | 11/1954 | Knapp . |
| 2,898,764 | 8/1959 | Kinsey et al. . |
| 3,048,416 | 8/1962 | Rogers . |
| 3,122,021 | 2/1964 | Karig . |
| 3,158,032 | 11/1964 | Lannen . |
| 3,203,255 | 8/1965 | Rexroat . |
| 3,269,199 | 8/1966 | Deehan et al. . |
| 3,352,732 | 11/1967 | Darr . |
| 4,492,346 | 1/1985 | Young ..................... 242/72.1 |
| 5,022,665 | 6/1991 | Hines et al. ............. 279/2.11 X |
| 5,033,303 | 7/1991 | Hines et al. ............. 73/485 |

FOREIGN PATENT DOCUMENTS 1393542  5/1988  U.S.S.R. .

*Primary Examiner*—Steven C. Bishop
*Attorney, Agent, or Firm*—Emch, Schaffer, Schaub & Porcello Co.

[57] ABSTRACT

A workpiece support tool is disclosed for use with in providing an infinite variety of positions to receive and engage workpieces of differing shapes and sizes. The workpiece support tool provides precise support and positioning of the workpiece with respect to an operational centerline. The support tool includes a plurality of radially moving jaw members having support surfaces for supporting the inner circumference of the workpiece. The jaw members are expanded and contracted in solely radial movement through driving forces imparted by a position encoded servo drive motor.

14 Claims, 7 Drawing Sheets

WORKPIECE SUPPORT TOOL

This is a continuation-in-part of copending application(s) 07/708,453 filed on May 31, 1991 and Ser. No. 07/729,219 filed on Jul. 12, 1991 both now abandoned. The subject-matter of both parent applications is expressly incorporated herein.

BACKGROUND ART

The present invention provides a versatile support tool for a workpiece which gives precise support and positioning of the workpiece with respect to an operational centerline.

There is a continuing need for a support tool to be used in engaging workpieces having a specified open inner diameter, such as tires, and positioning those workpieces in a maintained level and oriented relationship with an operational centerline. The workpiece support tooling of this invention is intended to be utilized with balancing measurement and correction operations but does not necessarily have to be limited to that use alone.

The workpiece support tool of this invention provides an infinite variety of settings for supporting and centering workpieces of varying sizes and shapes about a known centerline. The versatility of the tool of this invention enables the operator to make radial adjustments and on-the-fly adjustments to the tool sizing to adapt the tool to accept such continually changing workpieces. In the art of balancing, this level of versatility and accuracy was previously unavailable with prior art tools which are normally programmed with a specific workpiece size and shape in mind and, therefore, have a specific "open" setting and a specific "closed" setting for each different workpiece.

Non-rigid workpieces such as tires, when positioned on prior art tools, encountered problems in achieving optimum desired balancing results in a repeatable sequence. Devices such as that shown by Lannen in his two patents (U.S. Pat. Nos. 2,431,125 and 3,158,032) have retention arms that simply expand outwardly until the inner circumference of the workpiece exerts a sufficient counter-force to the expanding mechanism. Such prior art mechanisms do not account for influencing factors such as differing workpiece construction and size. Some flexible workpieces, such as tires, will distort when pressed upon their inner circumference or bead. Thus their variety in construction and size will greatly affect the level of distortion to the workpiece created by the forces of the expanding tool. For instance, a thin-walled high-performance tire will distort in a different manner than a thick-walled heavier tire. This distortion severely impacts the quantitative and qualitative accuracy of the unbalance measurement and subsequent corrective procedures.

Other devices, such as that shown by Rexroat (U.S. Pat. No. 3,203,255) overcome the undesirability of flexing the tire during engagement with the support tool by balancing the tire mounted on a hardened wheel. The device shown in Rexroat expands to engage the interior of a solid wheel and stops expanding when it encounters the immovable force of the inflexible wheel. The expansion of the retaining member further acts to push the tire/wheel combination to a centered position with respect to the balancing machine centerline. Since the tire and wheel assembly rests upon receiving arms there are, as a result, large frictional forces which must be overcome to place the workpiece in an accurate centered position. Further, a balancing operation using the Rexroat device must always account for balancing the wheel, which is undesirable in a manufacturing setting as the wheel does not always remain with the tire after balancing.

The manner in which a workpiece is loaded onto a balancing machine also greatly affects the ultimate accuracy of the balancing operation. Many prior art tools are designed to specifically open and close to retain a workpiece of a specific style. If the style of the workpiece is altered, these prior art tools are incapable of easily adapting to the change. It has been discovered that a tool that is prepositioned loosely enough to load a workpiece sometimes remains too loose to achieve the desired accurate centering and measuring of unbalance. Concurrently, a tool that is set ideally for centering and measuring unbalance doesn't always allow the workpiece to be properly seated and leveled with respect to the centerline, thus deleteriously affecting the angle and amount of the unbalance measurement. This problem is particularly bothersome when operations include the random applications of differing workpieces to the support tool.

There are two distinct methods for balancing flexible workpieces such as tires: non-rotating without inflation and rotating with inflation. Prior to this invention, the use of rotation with inflation was known to achieve an accuracy in imbalance measurement that was almost twice the accuracy achievable through non-rotation. However, rotating balancing can many times, be undesirable because of time considerations and complications due to the additional mechanisms required to keep the inflation seal. Thus, manufacturers are continually striving to achieve the accuracy and repeatability available from a rotating inflated system with the less complicated non-rotating uninflated system.

One method for determining the accuracy of an unbalance measuring system compares how closely the balancing device can duplicate or repeat an unbalance reading when the same workpiece is measured many times over. The common unit for measuring such "repeatability" is in inch/ounces or gm/cms. This unit reflects the amount of unbalance (ounces) at a measured distance (inches) from the centerline of the workpiece. As a general rule, tire manufacturers currently specify that a balancing machine must have repeatability of 1 inch/ounce for a 25-30 pound tire when using the rotating method and 3 inches/ounces when using the non-rotating method of measurement. However, manufacturers are persistently demanding increased accuracy and repeatability.

An object of the present invention is to provide a workpiece support tool that can be accurately sized to accept any workpiece in a repeatable manner and achieve accurate repeatable unbalance measurements.

Another object of this invention is to provide a workpiece support tool that is able to repeatedly position itself at a preselected location without error.

Another object of this invention is to provide a workpiece support tool adaptable to accepting workpieces of differing styles and weights, at random, and sequencing the size of the tool to repeatably achieve an optimum unbalance measurement for each of the differing styles and weights of the workpiece.

Another object of the invention is to provide a workpiece support tool having an infinite variety of settings and the versatility to continually adjust on-the-fly to accept differing workpieces and provide repeatable and accurate balancing measurements.

Another object of this invention is to provide a workpiece support tool that can variably control the position of its workpiece engagement members and the force with which engagement members support the workpiece for balancing.

Another object of this invention is to provide a workpiece support tool having at least three distinct positions of engagement for any workpiece, regardless of style or size: a position for loading the workpiece onto the tool; a position for retaining the workpiece during a balancing operation; and a position for unloading the workpiece after the balancing operation is completed.

Yet another object of the invention is to provide a workpiece support tool for use with a non-rotating balancing method that is capable of achieving balancing accuracies and repeatability equal to or better than that achievable by a rotating balancing method.

DISCLOSURE OF INVENTION

The present invention provides a support tool for a workpiece which is capable of achieving these objectives. The support tool will provide for precise support and positioning of a variety of workpieces of differing sizes and shapes with respect to an operational centerline. The support tool includes a plurality of jaw members which are driven to move in a solely radial direction to create an infinite variety of precise diameters and outer circumferences designated to provide optimum retention conditions for any number of workpieces of differing sizes, shapes and weights. The present invention provides a sequence in its operation which allows the workpiece to be loaded on the tool, pre-sized and then fully sized to accurately level and center the workpiece, and then unloaded from the tool. This sequence assists the tool in achieving the high optimum rates of accuracy and repeatability demanded by this invention. The jaw members of the support tool are driven either through a cone-shaped drive member mounted for movement along a centerline oriented ball screw or by individual ball screws designed to receive their input from a single centerline oriented drive source.

The invention will be more fully understood after reading the following Best Mode of Carrying Out The Invention with reference to the accompanying drawings.

BRIEF DESCRIPTION OF THE DRAWINGS

FIG. 10 is a detail view of the drive gearing including the servo drive engagement device for the workpiece support tool of the present invention.

BEST MODE OF CARRYING OUT THE INVENTION

Figure 1:
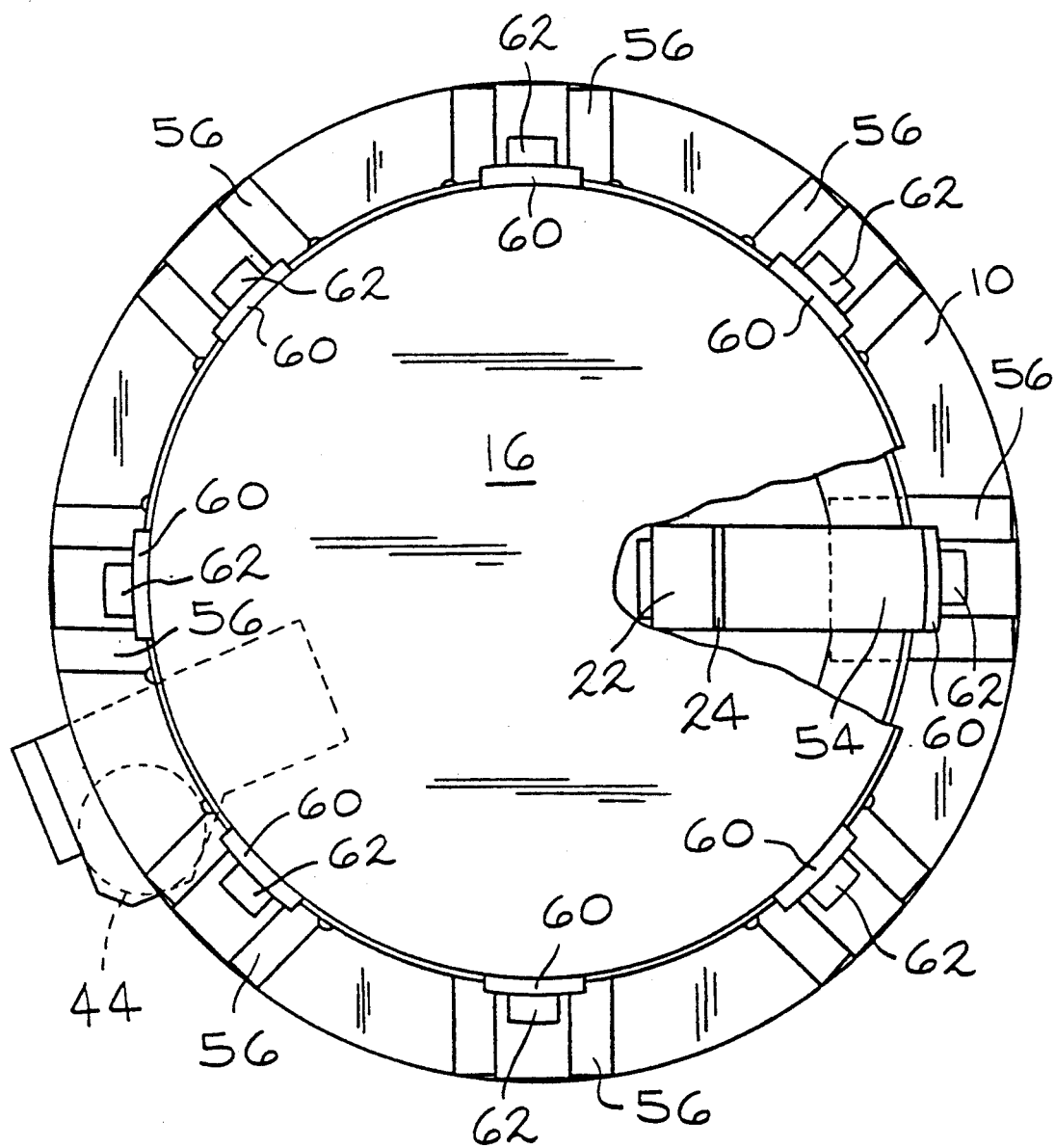
FIG. 1 is a top view of the workpiece support tool of the present invention with a cutaway showing the engagement of a jaw member with the drive member.

The workpiece support tool of the present invention is intended to have many uses and applications. For ease of explanation, the best mode of the invention will be described for use in measuring the unbalance of tires. This description, however, is not intended to limit the application of the invention to such a use.

Referring now to FIGS. 1-4, the preferred embodiment of the workpiece support tool of the present invention has a base member 10 designed to place the support tool into an engaged relationship with a balancing machine wherein the axial centerline of the support tool coincides with the axial centerline of the balancing machine. A tubular member 14 extends along the axial centerline of the support tool upwardly from the base member 10. A cap member 16, opposed from the base member 10 is engaged with the tubular member 14. A ball screw member 18, positioned along the axial centerline within the tubular member 14, is engaged for rotation with the tubular member 14 between the base member 10 and the cap member 16. Preferably, the ball screw member 18 is mounted on the base member 10 utilizing double preloaded ball bearings 72 designed to maintain the accurate centered position of the ball screw member 18. A ball nut member 20 is located on the ball screw member 18 to be driven along the axial centerline as the ball screw 18 is rotated. A drive member 22 is positioned on the tubular member 14 for movement between the cap member 16 and base member 10. The drive member 22 includes a plurality of identical inclined surfaces 24, such inclined surfaces 24 defining an inverted cone shape.

The tubular member 14 includes at least two opposed radially extending slots 26. The drive member 22 is engaged with the ball nut 20 by means of an attachment collar 28. Thus, as the ball screw 18 is rotated, the ball nut 20 imparts an axial motion to the drive member 22, through the engagement with attachment collar 28, causing the drive member 22 to axially move along the exterior surface of the tubular member 14.

The rotational motion of the ball screw 18 is provided through a series of motion translation gears which are driven by a servo drive motor having a precision encoder. A first bevel gear 30 is fixed to the end of the ball screw 18. A second bevel gear 32 engages the first bevel gear 30. The second bevel gear 32 is driven by a shaft 34 which is engaged with a no back bearing 36. The no back bearing 36 prevents undesirable movement of the drive member 22 when the drive input from the servo drive motor is disconnected. The end of the shaft 34 which is opposed to the bevel gear 32 includes a drive gear 38 designed to mate with a helical gear 40. The helical gear 40 is attached by a shaft 42 to an engagement coupling 44.

Referring to FIG. 10, the engagement coupling 44 engages the servo drive motor with the translation gearing. The engagement coupling 44 includes a male member 46 and a female member 48. Within the female member 48 are two engagement pins 50 designed to engage the surface of the male member 46 when the coupling 44 is in the engaged position. The engagement pins 50 will also act to engage the indented surface 52 of the male member 46 when the coupling 44 is in the disengaged position if the male member 46 and the female member 48 attempt to rotate with respect to each other. The disengaged engagement between the engagement pins 50 and the indented surface 52 prevents any unwanted rotation of the gearing when the servo drive motor is uncoupled. The engagement coupling 44 is used in the present invention to physically disconnect the servo drive motor from the translation gearing, thereby allowing the support tool with the workpiece to rest solely, without interference, on the unbalance measuring machine during the balancing operation.

Figure 2:
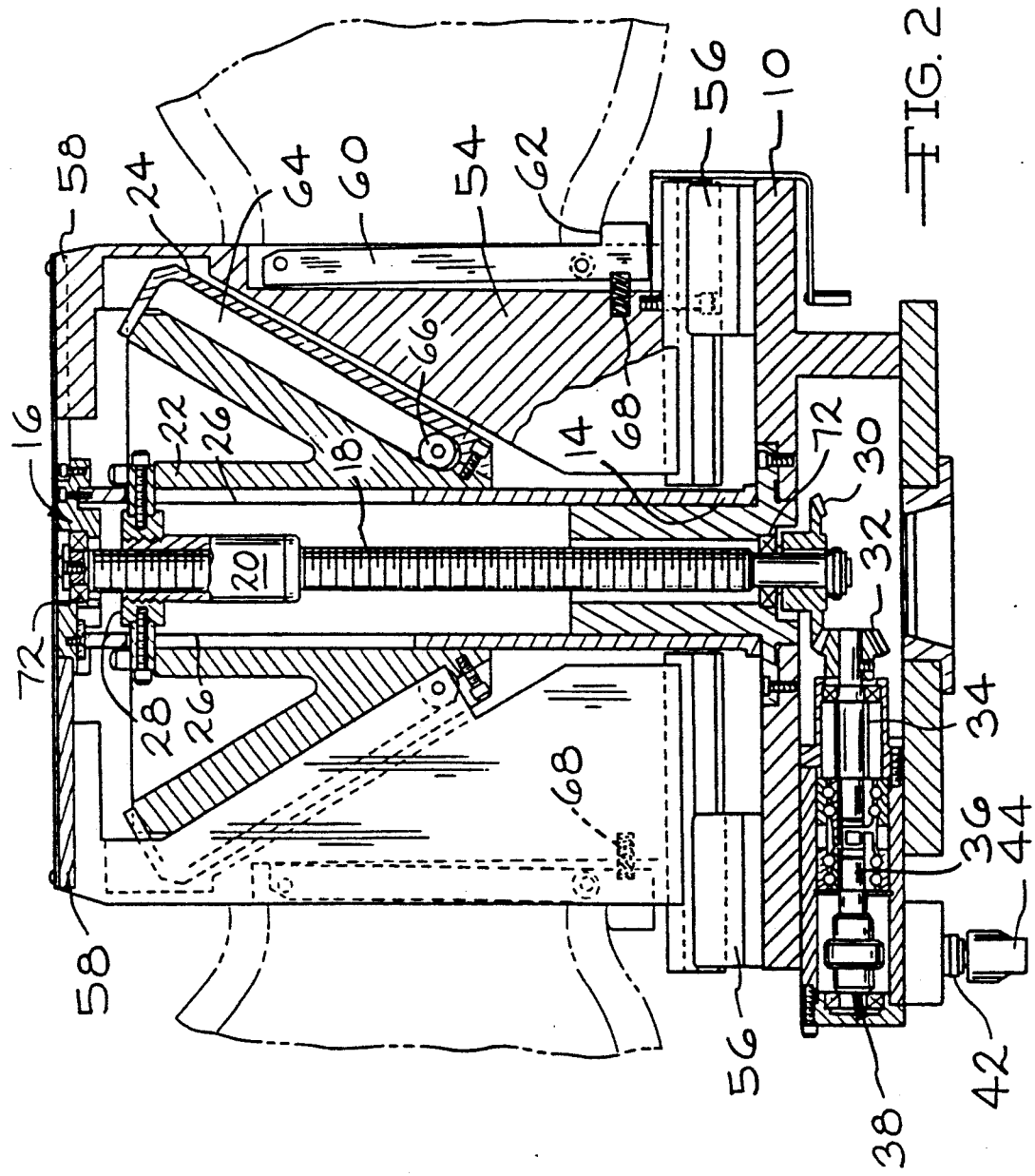
FIG. 2 is a sectional side view of the workpiece support tool of FIG. 1 with the jaw members extended in their smallest radial orientation.
Figure 3:
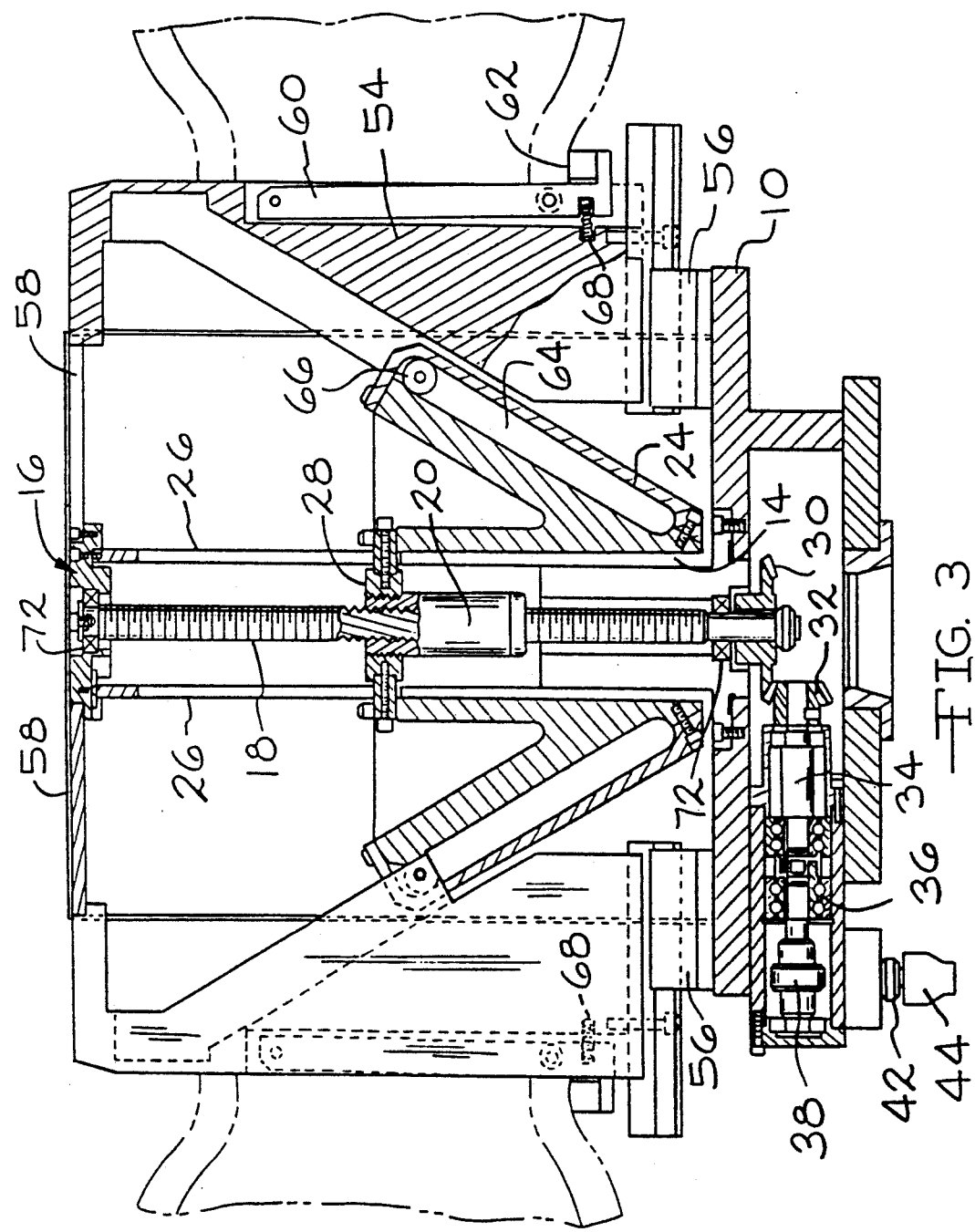
FIG. 3 is a sectional side view of the workpiece support tool of FIG. 1 with the jaw members extended in their full radial orientation.
Figure 4:
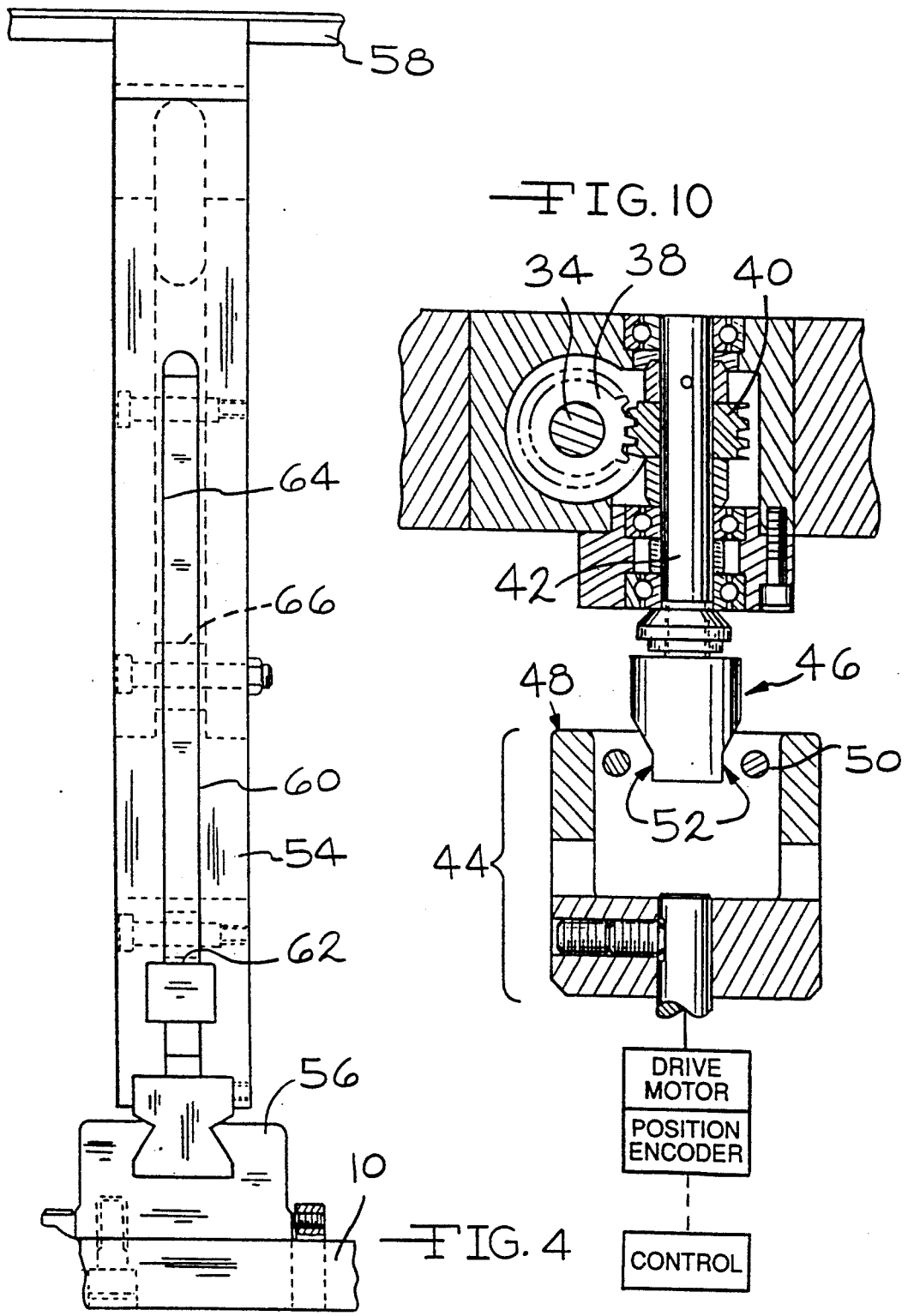
FIG. 4 is a detailed view of a jaw member of the workpiece support tool of FIG. 1 engaged with the drive member.
Figures 5, 6:
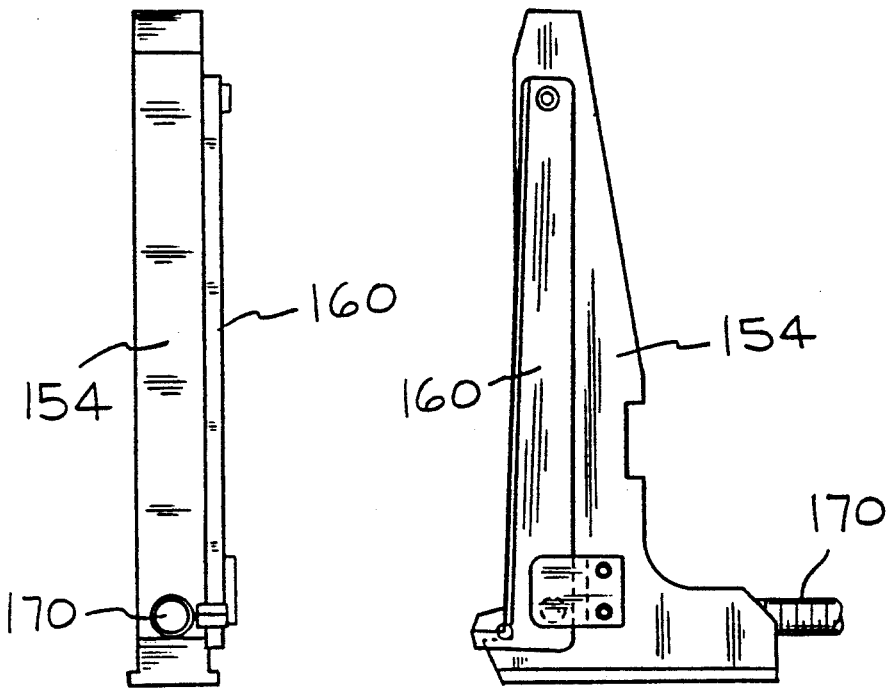
FIG. 5 is a front view of an alternative embodiment of a jaw member intended for use in the workpiece support tool of the present invention.
FIG. 6 is a side view of the jaw member of FIG. 5.
Figure 7:
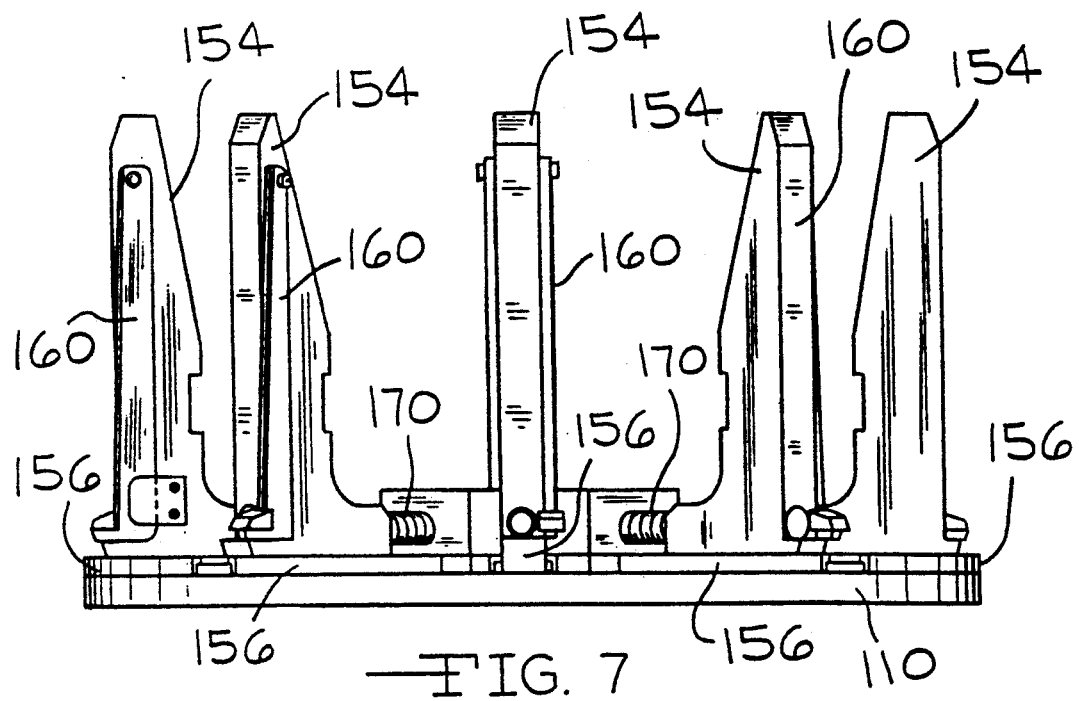
FIG. 7 is a side view of the alternative embodiment of the workpiece support tool of the present invention incorporating the jaw member of FIG. 5.
Figure 8:
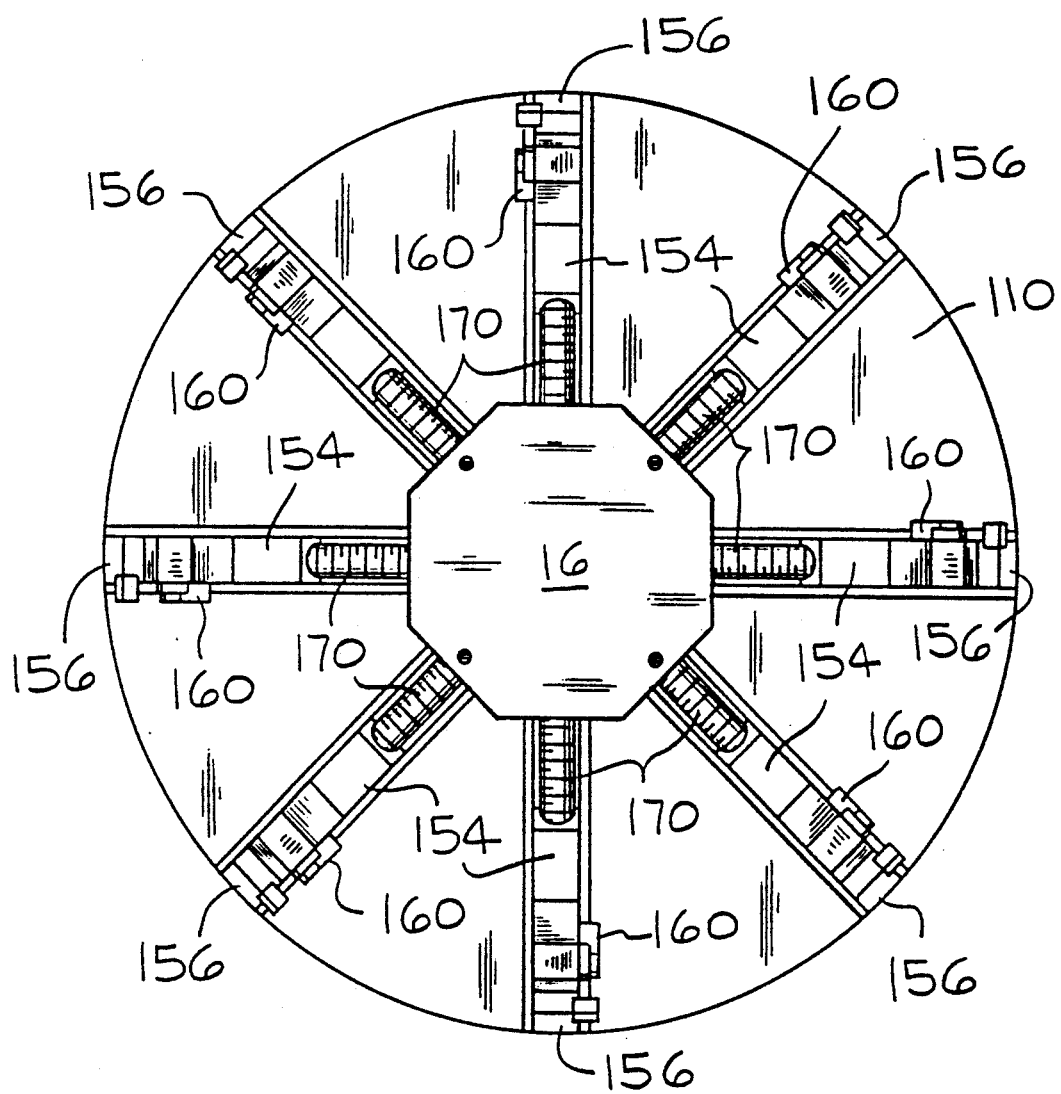
FIG. 8 is a top view of the workpiece support tool of FIG. 7.
Figure 9:
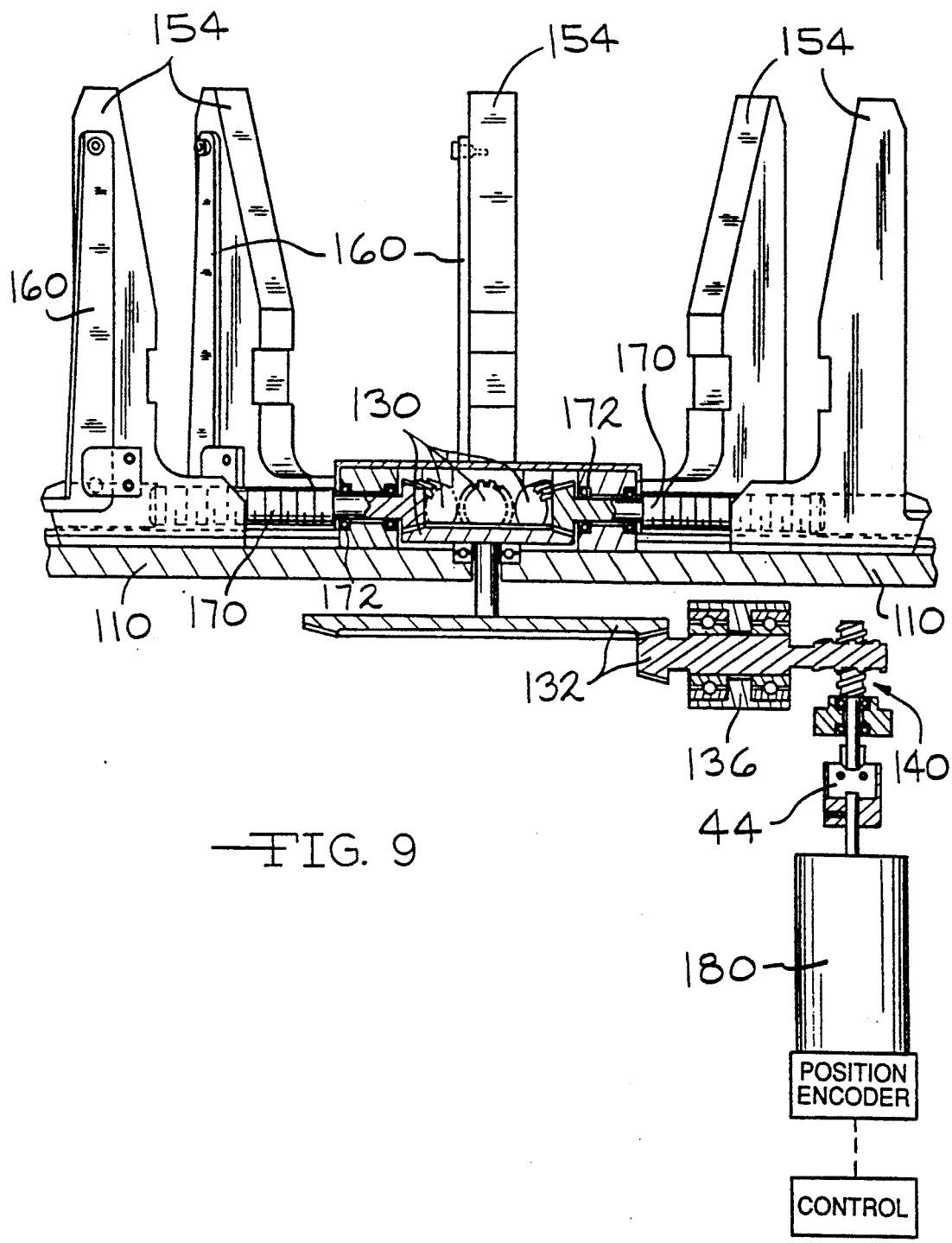
FIG. 9 is a sectional side view of the workpiece support tool of FIG. 7.

Referring now to FIGS. 2 and 3, a plurality of radially oriented jaw members 54 are positioned between the base member 10 and the cap member 16 for radial movement with respect to the axial centerline. The jaw members 54 are mounted on the base member 10 on ball slides 56, which are linear bearings having preloaded recirculating ball tracks (not shown), designed to ensure that the jaw members 54 move symmetrically in a radial direction thereby always maintaining accuracy in locating the center of gravity of the workpiece. The jaw members 54 further engage a guide member 58 located on the cap member 16 to assist accurate radial movement.

In the preferred embodiment there are eight jaw members 54 spaced equally about the centerline of the support tool. Each jaw member 54 of the support tool includes a vertically extending finger 60 mounted on the jaw member 54 to radially extend outward from the jaw member 54. A spring 68 is positioned between the finger member 60 and the jaw member 54 and acts to maintain the finger member 60 in a position slightly outside the radius of the jaw member 54. The finger member 60 includes an engagement surface 62 designed to engage and support the workpiece. The spring positioned finger member 60 provides an increased radial position over the radial position of the jaw member 54 so that the engagement surface 62 first engages the workpiece as the workpiece is lowered onto the support tool. This prevents unwanted distortion of the workpiece during loading and helps maintain the workpiece in a centered and level orientation with respect to the centerline of the support tool.

The jaw members 54 are engaged with the inclined surfaces 24 of the drive member 22. Each inclined surface 24 of the drive member 22 includes an engagement slot 64. Each jaw member 54 includes a pin 66 which is designed to interconnect with the engagement slot 64 of the inclined surface 24 of the drive member 22. As the ball screw 18 rotates and causes the drive member 22 to move axially through its engagement with the ball screw 18 by the ball nut 20 and engagement coupling 44, the pin 66 will slide in the engagement slot 64 thus directing the respective engaged jaw members 54 to move in an inward or outward radial direction with respect to the axial centerline of the support tool. Once the jaws are positioned, the no back bearing 36 will prevent any unwanted radial movement of the jaw members 54 after disconnection of the drive system.

The present invention operates in sequence as follows. The jaw members 54 are positioned in a predetermined radial orientation according to information relating to the oncoming workpiece which is known to the operator. The jaw members 54 are first radially contracted to a position having an outside diameter slightly less than the inside diameter of the workpiece. As the workpiece is lowered onto the support tool, the interior circumference of the workpiece first engages the spring loaded finger member 60 and then comes to rest on the engagement surface 62. The jaw members 54 are then radially expanded by the precision encoded servo drive motor to a precalculated position designed to engage the workpiece with the jaw member 54, without distortion, while the workpiece is resting on the engagement surface 62. Since the jaw 54 positions are approached in an expanding mode, it is assured that there will always be a solid gear tooth against gear tooth interconnection between the input servo drive and the jaw members 54. The workpiece is now level with respect to the axis of the support tool and centered with respect to the axis of the support tool. After the balancing operation is completed, the jaw members 54 of the support tool are retracted slightly to disengage from the interior circumference of the workpiece so that the workpiece remains resting solely on the engagement surface 62 of the finger members 60. The workpiece may then be removed from the support tool.

The alternative embodiment of the present invention, shown in FIGS. 5-9, incorporates much of the same design as that of the preferred embodiment and, in fact, operates in a very similar manner to the preferred embodiment just described. The alternative embodiment includes a base member 110 on which a plurality of radially oriented jaw members 154 are positioned for radial movement. The jaw members 154 are mounted on the base member 110 on ball slides 156, which are linear bearings having preloaded recirculating ball tracks (not shown) designed to ensure that the jaw members 154 move symmetrically and solely in a radial direction, thereby maintaining accuracy in locating the center of gravity of the workpiece. Preferably, there are 8 jaw members 154 spaced equally about the centerline of the support tool. The jaw members 154 include the vertically extending finger members 160 as described with regard to the preferred embodiment. Each jaw member 154 is engaged with and driven by a ball screw/nut assembly 170, each of which is mounted onto the base member 110 utilizing double preloaded ball bearings 172 designed to maintain the accurate rigid radial positioning of the ball screws 170. The individual ball screws 170 are all engaged with a servo drive motor 180 having a precision encoder through a series of motion translation gears. The individual ball screws 170 are driven through two sets of bevel gears 130, 132 which are engaged through a no back bearing 136 to a helical drive 140 engaged with the coupling device 44 of FIG. 10 as previously described with respect to the preferred embodiment. Operation of the workpiece support tool of the alternative embodiment is virtually similar to that of the preferred embodiment.

The workpiece support tool of the present invention provides for great flexibility in sizing the tool to adapt to different sized workpieces. Since each workpiece may vary in design as to inside and outside diameter, width, weight and strength of construction, the workpiece support tooling can be easily adapted to the individual requirements of each workpiece. Preferably, the workpiece support tool and position encoded servo drive motor can be linked with computer controls which provide the flexibility to call up the ideal sizing sequences for each type of workpiece being fed at random to the workpiece support tool without any tooling change. After the workpiece is identified, the appropriate sequence steps can be called up or, if no computer controls are provided, the operator can input the proper sequence steps.

Statistical process control tests run on the workpiece support tool of the present invention indicate that the repeatability and accuracy of the tooling is greatly enhanced when compared with desired target repeatability. Statistical process controlling takes a sample number of readings from an operating balancing machine and statistically applies those readings to predict the accuracy range of the machine. In a test wherein a sample of 8 workpieces was run through the a device utilizing the present invention 10 times each, rotating the workpiece 90° each time, the following test results were obtained.

|        | Repeatability | Target     | Accuracy of Chuck from True Centerline |
|--------|---------------|------------|----------------------------------------|
| Tire A | 1.03 in/oz    | 2.78 in/oz | ±.000644"                              |
| Tire B | 1.04 in/oz    | 1.21 in/oz | ±.000738"                              |
| Tire C | .89 in/oz     | .96 in/oz  | ±.000795"                              |
| Tire D | .62 in/oz     | 1.10 in/oz | ±.000483"                              |

The test results show that the repeatability bettered the target with respect to each workpiece. Further, the test results show that the workpiece support tool of the present invention can hold the workpiece in the worse case + −0.000795" to the best case + −0.000483" to the true centerline. The best known prior art data shows a tolerance of + −0.002" to the true centerline. Further, the best known in/oz repeatability can only approach 2 in/oz.

The above descriptions of the preferred and alternative embodiments of the present invention are intended to be instructive in nature and are not intended to be limiting upon the scope and content of the following claims.

We claim:

1. A workpiece support tool for engaging a workpiece having a specified inner diameter comprising, in combination:
   a plurality of jaw members engaged for movement upon a base member, said jaw members being equally spaced in a concentric pattern around an axial centerline of the support tool and having workpiece engagement surfaces equally disposed in equidistant radial amounts from such axial centerline;
   a drive member engaged with said jaw members for moving said jaw members and their respective engagement surfaces in equidistant increments and in a solely radial direction to adjust the radial distance between said engagement surfaces and such axial centerline, while always maintaining said engagement surfaces equidistantly from such centerline; and
   a servo driven motor, having a position encoder to provide precise rotational input to said motor, engaged with said drive member for providing precise and equal radial movement to said jaw members, wherein said jaw members are radially oriented by said servo motor as controlled by said position encoder to an infinite number of radial positions and such radial positions are repeatably obtained for any incoming workpiece having the same specification as such workpiece.

2. The support tool of claim 1, wherein said position encoder and said servo motor operate to radially contract said jaw members such that said engagement surfaces are positioned to form a diameter slightly smaller than the specified inner diameter of the workpiece before the workpiece is placed onto said support tool to level and center such workpiece and then radially expand said jaw members such that said engagement surfaces form a specified diameter for engaging only the inner circumference of the workpiece and retaining the workpiece in a fixed level and centered orientation with respect to such centerline.

3. The support tool of claim 2, wherein said position encoder and said servo motor also radially contract said jaw members after such radial expansion to a final position for facilitating removal of such workpiece from said tool.

4. The support tool of claim 1, wherein each of said jaw members is engaged with said base member through a ball slide having a linear bearing with preloaded recirculating ball tracks.

5. The support tool of claim 1, wherein said drive member includes a ball screw positioned on said base member and extending along such axial centerline of said support tool; a ball nut engaged with said ball screw for movement thereon; and an inclined member engaged with said ball nut and in communication with each of said jaw members, whereby rotation of said ball screw imparts movement to said ball nut and said inclined member along the axial centerline, wherein the communication between said inclined member and said jaw member causes said jaw members and their respective engagement surfaces to move solely in equidistant radial amounts.

6. The support tool of claim 5, wherein said ball screw is mounted in said base member by means of a double, preloaded ball bearing assembly.

7. The support tool of claim 1, further including a means for disengaging said drive member from servo driven motor and a means for locking said drive member in position during such disengagement.

8. The support tool of claim 1, further including a control means with memory for providing input to said position encoder of said servo driven motor regarding jaw member positioning sequences for receiving and engaging incoming workpieces having a variety of random sizes, shapes, weights and designs.

9. The workpiece support tool of claim 1, wherein said drive member includes a ball screw engaged with each of said jaw members wherein each of said jaw members is driven in precise radial amounts by rotational movement of said ball screw; said ball screws all receiving their drive input from a single drive source engaged with said position encoded servo driven motor.

10. The support tool of claim 8, wherein said ball screws are each mounted in said base member by means of a double preloaded ball bearing assembly.

11. A workpiece support tool for engaging a workpiece having a specified inner diameter comprising, in combination:
   a plurality of jaw members, each jaw member mounted on a ball slide fixed to a base member, said ball slide having a linear bearing with preloaded recirculating ball tracks, said jaw members being equally spaced in a concentric pattern around an axial centerline of the support tool and having workpiece engagement surfaces equally disposed in equidistant radial amounts from such axial centerline;

a ball screw mounted on said base member by means of a double, preloaded ball bearing assembly and extending along the axial centerline of said support tool;

a ball nut engaged with said ball screw for movement thereon, and an inclined member engaged with said ball nut and in communication with each of said jaw members, whereby rotation of said ball screw imparts movement to said ball nut and said inclined members along the axial centerline, wherein the communication between said inclined member and said jaw member and causes said jaw members and their respective engagement surfaces to movement in an equidistant and solely radial direction to adjust the radial distance between said engagement surfaces and such axial centerline, while always maintaining said engagement surfaces equidistantly from said centerline;

a servo driven motor, having a position encoder to provide precise rotational input to said motor, engaged with said ball screw for providing precise and equal radial movement to said jaw members, wherein said jaw members are radially oriented by said servo motor as controlled by said position encoder to an infinite number of radial positions and such radial positions are repeatably obtained for any incoming workpiece having the same specification as such workpiece;

means for disengaging said ball screw from said servo driven motor and means for locking said ball screw in position during such disengagement; and control means with memory for providing input to said position encoder of said servo driven motor regarding jaw member positioning sequences for receiving and engaging incoming member positioning sequences for receiving and engaging incoming workpieces having a variety of random shapes, sizes, weights and designs.

12. The support tool of claim 11, wherein said position encoder and said servo motor operate to radially contract such that said engagement surfaces are positioned to form a diameter slightly smaller than the specified inner diameter of the workpiece before the workpiece is placed onto said support tool to level and center such workpiece, and then radially expand said jaw members such that said engagement surfaces form a specified diameter for engaging only the inner circumference of the workpiece and retaining workpiece in a fixed level and centered orientation with respect to such centerline.

13. The support tool of claim 12, wherein said position encoder and said servo motor also radially contract said jaw members after such radial expansion to a final position for facilitating removal of such workpiece from said support tool.

14. A workpiece support tool for engaging a workpiece having a specified inner diameter comprising, in combination:

a plurality of jaw members positioned on ball slides fixed to a base member, said ball slides having linear bearings with preloaded recirculating ball tracks, said jaw members being equally spaced in a concentric pattern around the axial centerline of the support tool and having workpiece engagement surfaces equally disposed in equidistant radial amounts from such axial centerline;

a plurality of ball screws, each ball screw engaged with each of said jaw members wherein each of said jaw members and their respective engagement surfaces are driven in equidistant increments in a solely radial direction by rotational movement of said ball screws to adjust the radial distance between said engagement surfaces and such axial centerline while always maintaining said engagement surfaces equidistantly from such centerline, said ball screws all receiving their drive input from a single drive source;

a servo driven motor, having a position encoder to provide precise rotational input to said motor engaged with said single drive source for providing precise and equal radial movement to said jaw members, wherein said jaw members are always radially contracted such that said engagement surfaces are positioned to form a diameter slightly smaller than the specified inner diameter of the workpiece before the workpiece is placed onto said support tool to level and center such workpiece and said jaw members are radially expanded such that said engagement surfaces form a specified diameter for engaging only the inner circumference of the workpiece and retaining the workpiece in a fixed level and centered orientation with respect to such centerline;

means for disengaging said single drive source from said servo driven motor and a means for locking said single drive source in position during such disengagement; and control means with memory for providing input to said position encoder of said servo driven motor regarding jaw member positioning sequences for receiving and engaging incoming workpieces having a variety of random sizes, shapes, weights and designs.

* * * * *